Nov. 23, 1965  H. S. HARRISON  3,219,172
LIVE ROLLER CONVEYOR
Filed Nov. 1, 1963  3 Sheets-Sheet 1
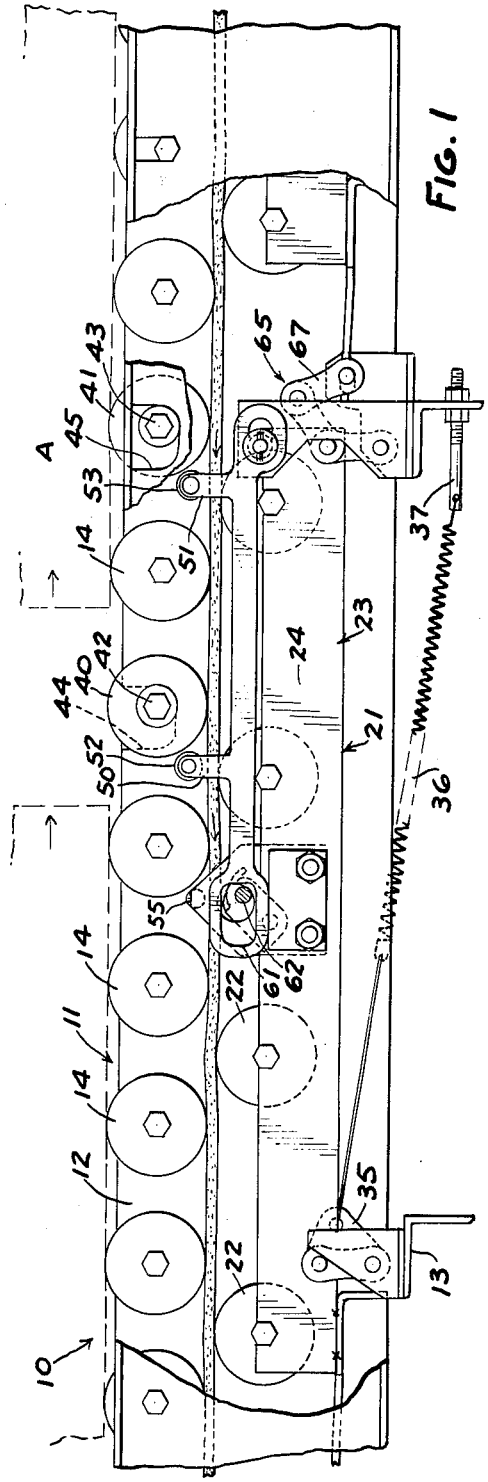
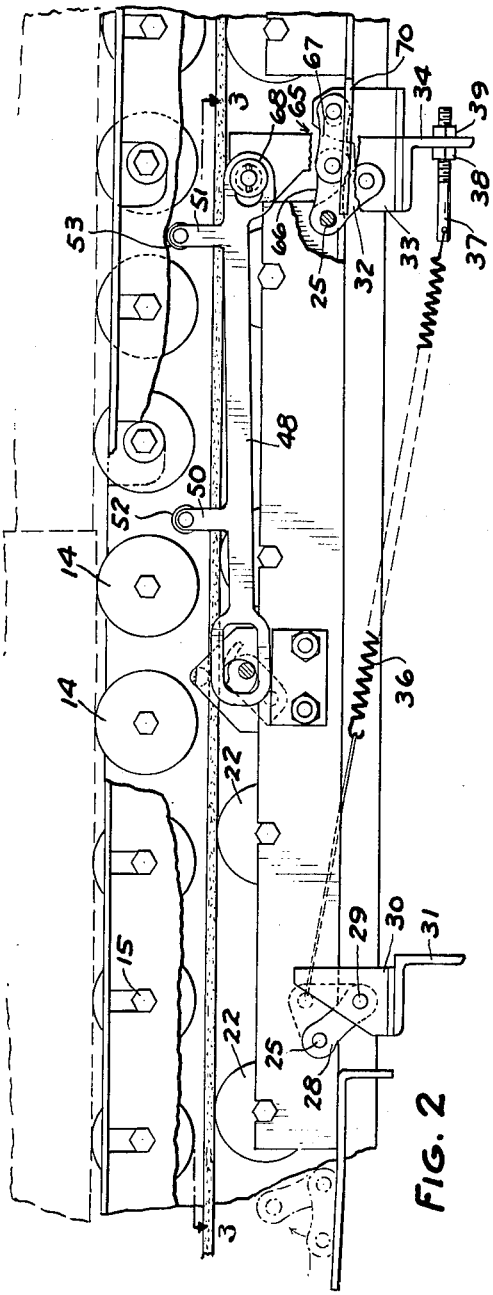
INVENTOR.
HOMER S. HARRISON
BY
Barnes, Kisselle, Raisch & Choate
ATTORNEYS

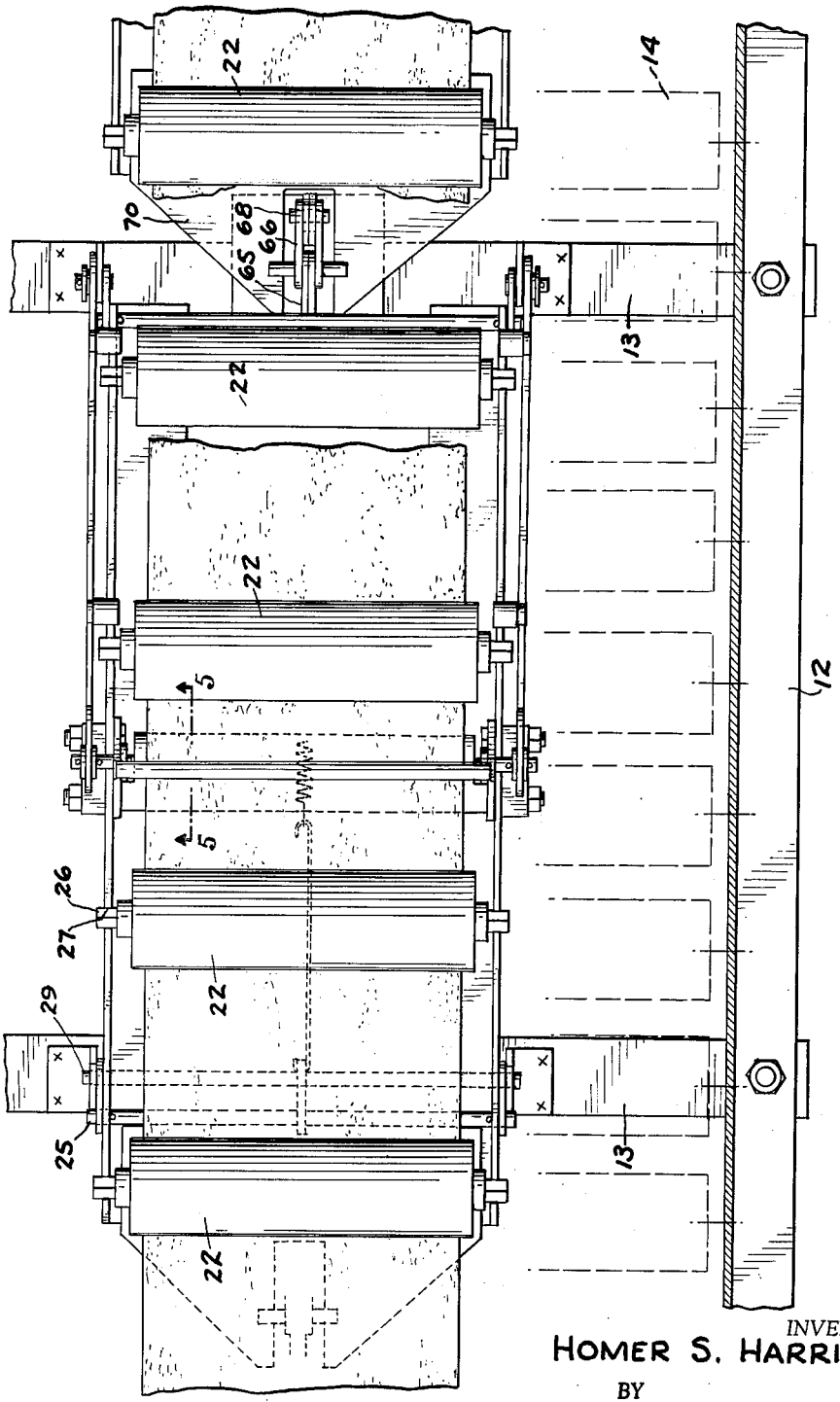

Nov. 23, 1965
H. S. HARRISON
3,219,172
LIVE ROLLER CONVEYOR
Filed Nov. 1, 1963
3 Sheets-Sheet 3
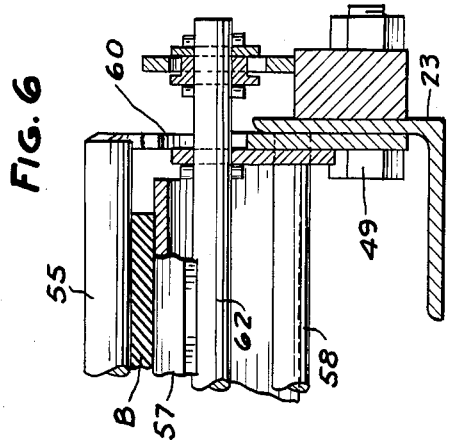
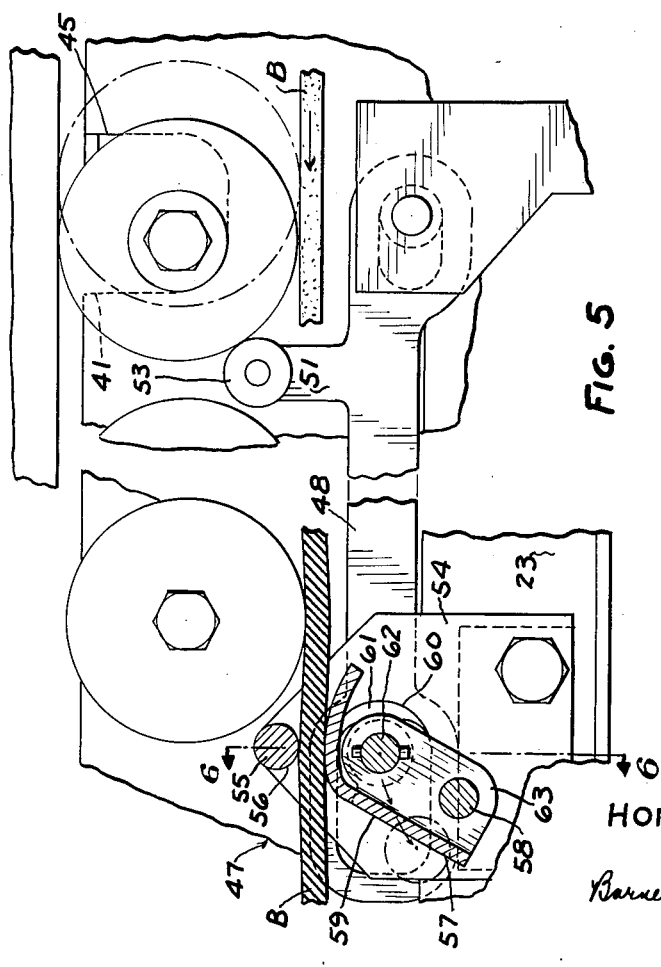
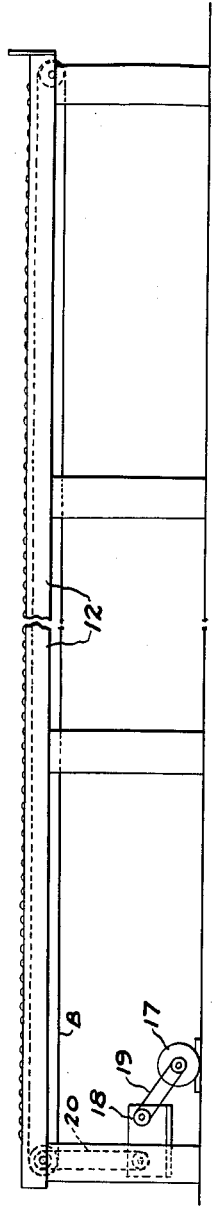
INVENTOR.
HOMER S. HARRISON
BY
*Barnes, Kisselle, Raisch, & Choate*
ATTORNEYS

United States Patent Office 3,219,172
Patented Nov. 23, 1965

3,219,172
LIVE ROLLER CONVEYOR
Homer S. Harrison, Detroit, Mich., assignor to Mechanical Handling Systems, Inc., Detroit, Mich., a corporation of Michigan
Filed Nov. 1, 1963, Ser. No. 320,880
6 Claims. (Cl. 198—127)

This invention relates to live roller conveyors.

In my prior application Serial No. 201,914, filed June 12, 1962, of which this application is a continuation-in-part, there is disclosed and claimed an improved live roller conveyor.

It is an object of this invention to provide a further improved live roller conveyor of the type shown in my prior application.

Basically, the invention comprises providing a pair of trigger rollers in line in a series of conveyor rollers with a conveyor roller interposed between each pair of trigger rollers. Each pair of trigger rollers is movable rearwardly when an article is interrupted thereover because of its tracks along the bottom of the article due to its driving connection with the belt. The rearward movement of the trigger rollers momentarily disengages a clutch that moves a section of pressure rollers downwardly out of engagement with the belt. Locking means are provided for locking the pressure rollers out of engagement. When the obstruction to movement of the articles along the conveyor is removed so that the articles can again move along the conveyor, each section of pressure rollers is successively released to re-engage successive portions of the belt. The re-engagement is automatic, one pressure roller section actuating the locking means to release the pressure roller section in the succeeding section so that the pressure roller sections can move upwardly into engagement with the underside of the belt.

In the drawings:

FIG. 1 is a fragmentary part sectional side elevational view of a live roller conveyor embodying the invention.

FIG. 2 is a view similar to FIG. 1 showing the parts in a different operative position.

FIG. 3 is a fragmentary plan view of the live roller conveyor, parts being broken away.

FIG. 4 is a fragmentary side elevation of a live roller conveyor.

FIG. 5 is a fragmentary part sectional view taken on an enlarged scale along the line 5—5 in FIG. 3.

FIG. 6 is a fragmentary sectional view taken along the line 6—6 in FIG. 5.

Referring to FIGS. 1, 2 and 3, the live roller conveyor 10 embodying the invention comprises a main frame 11 consisting of side rails 12 extending longitudinally of the conveyor and supporting the cross rails 13 by means of adjustable screws and nuts. A plurality of transverse conveyor rollers 14 are provided and journalled at longitudinally spaced points on the side rails 12. Each roller 14 includes a shaft 15 extending through an opening in the side rails 12 and a ball bearing 16 rotatably mounting the roller on the shaft 15.

Conveyor rollers 14 are adapted to engage the underside of articles, such as boxes, and move them longitudinally thereover to the right, as shown in FIG. 1. In order to achieve this, the rollers are driven from below by engagement with the upper reach of an endless driven belt B. As shown in FIG. 4, endless belt B is driven continuously by electric motor 17 through a gear box 18 and interconnecting endless chains 19, 20. Movement of the belt to the left, as shown in FIG. 1, causes the conveyor rollers 14 to rotate clockwise and move the articles A to be conveyed to the right (FIG. 1).

In order to maintain driving engagement between the belt B and the conveyor rollers 14, a plurality of pressure roller assemblies or sections 21 are provided at longitudinally spaced points along the conveyor. Each section includes a plurality of longitudinally spaced pressure rollers 22 which are adapted to be moved upwardly into contact with the underside of the belt B thereby forcing the belt into driving engagement with the conveyor rollers 14.

As shown in FIGS. 1 and 2, each pressure roller section 21 comprises a pressure roller frame 23, consisting of side members 24 connected by transverse rods 25, extending between the side members 24. The pressure rollers 22 are rotatably mounted on shafts 26 which engage upwardly, opening slots 27 in the upper edges of the side members.

The pressure roller frame 23 is mounted for movement toward and away from the belt at one end by links 28 which are pivoted to the rod 25 and pins 29 on brackets 30 fixed on a cross-rail 31 and at the other end by links 32 pivoted to the other rod 25 and to brackets 33 fixed on another cross-rail 34. By this arrangement, the pressure roller frame 23 and, in turn, the pressure rollers 22 are mounted for movement upwardly and forwardly of the conveyor toward the belt B and downwardly and rearwardly of the conveyor away from the belt B. A vertical spring plate 35 mounted on the rod 25 and pin 29 serves as an anchor for one end of the tension spring 36 which yieldingly urges the pressure roller frame 23 upwardly. The other end of the spring is connected to a rod 37 that is adjustably mounted on cross-rail 34 by nuts 38, 39 so that the tension on the spring 11 can be varied.

When the movement of the articles being conveyed is interrupted, the pressure roller frame 23 is moved downwardly out of engagement with the belt B. In order to achieve this movement, a pair of trigger rollers 40, 41 are mounted on side rails 12 with a conveyor roller 14 therebetween. Trigger rollers 40, 41 are mounted on shafts 42, 43 riding in slots 44, 45. The lower edges of the slots 44, 45 extend upwardly and rearwardly for reasons presently described. Trigger rollers 40, 41 are adapted to be driven by belt B.

When article A is interrupted in its movement along the rollers 14, as when an obstruction is placed in the path of the article, intentionally or otherwise, the belt B engaging the trigger rollers 40, 41 tends to cause the trigger rollers 40, 41 to rotate as usual but the engagement with the article A prevents rotation of the trigger rollers 40, 41 about their shafts. As a result, the trigger rollers 40, 41 track along the bottom of the article A thereby moving rearwardly in the slots 44, 45. This movement causes a clutch 47 to momentarily engage belt B and move the pressure roller frame 23 downwardly and rearwardly thereby moving the pressure rollers 22 out of engagement with the belt B.

The movement of either of the trigger rollers 40, 41 is transmitted to the clutch 47 by a trigger lever 48 which is pivoted to a side of the pressure roller frame by a bolt 49 which extends through an elongated opening in the lever 48. Trigger lever 48 includes a pair of upwardly extending arms 50, 51 on which rollers 52, 53 are rotatably mounted in position to be engaged by the trigger rollers 40, 41, respectively, as they move rearwardly of the conveyor when an article is stopped over the trigger rollers.

Referring to FIG. 5, clutch 47 is mounted on the pressure roller frame 23 and comprises opposed brackets 54 mounted on the side rails 24 of the pressure roller frame 23. A first fixed clutch member 55 extends transversely between the brackets 54 in overlying relation to the belt B and is provided with a contact surface 56. A second clutch member 57 is pivoted to a cross pin 58 extending between the brackets 54. Second clutch member 57 includes a transversely extending and longitudinally curved surface 59.

When an article is interrupted in its movement along the conveyor and causes one or more of the trigger rollers 40, 41 to track along the underside thereof and move rearwardly, the trigger lever 48 is swung rearwardly or counterclockwise, as viewed in FIGS. 1 and 2, bringing a cam surface on the forward edge 60 of slots 61 on the rear end of each arm 48 into engagement with a rod 62 extending between the flanged ends 63 of the second clutch members 57 at each end of the clutch member. This swings the clutch member 57 upwardly and rearwardly bringing the surface 59 into engagement with the underside of the belt B and causes the belt B to be gripped between surfaces 56, 59 of the clutch. Since the belt B is moving rearwardly or to the left, as shown in FIGS. 1 and 2, the pressure roller frame 23 is carried rearwardly and due to its linkage to the main frame, necessarily moves downwardly out of engagement with the undersurface of the belt B (FIG. 2).

As the pressure roller frame 23 moves rearwardly and downwardly, provision is made for disengaging the clutch 57. As the pressure roller frame 23 moves downwardly and rearwardly or to the left, as shown in FIGS. 1 and 2, the rod 62 rides in the slots 61. When the rod 62 reaches the end of the slots 61, further movement of the second clutch member 57 is prevented so that, as the pressure frame 23 continues to move downwardly and rearwardly because of its momentum, the second clutch member 57 is pivoted clockwise relative to brackets 54 and moves downwardly relative to the first clutch member 55 disengaging the clutch 57 (FIG. 2). When the clutch is disengaged, trigger rollers 40, 41 are in position to roll forwardly under the action of gravity along the inclined slots 44, 45 to their original position when the article theeron is moved along the conveyor.

In order to maintain the pressure roller frame 23 and, in turn, the pressure rollers 22 in their downward position out of engagement with the belt, an overcenter linkage 65 is provided at one end of the pressure roller frame (FIG. 1). As shown in FIGS. 1 and 2, the overcenter linkage 65 comprises a first pair of links 66 pivoted to one end of the pressure roller frame on a cross pin and a second pair of links 67 pivoted to the other end of the links 66 by a pin 68 and to brackets 33 by a pin 69 fixed to cross-rail 34. Links 67 include slots through which the pin 69 extends so that there is some permissible relative movement between the links and pin 69.

When the pressure roller frame is moved downwardly, the links 66, 67 are extended so that the pin 68 that connects the links 66, 67 is moved overcenter locking the pressure roller frame 23 in lowered position. The overcenter linkage 65 is retained in locked position and returned to its unlock position, permitting the spring 36 to move the pressure roller frame upwardly, by a release plate 70 fixed on the rear end of the preceding pressure frame 23 so that, when the preceding pressure roller frame moves upwardly, release plate 70 engages the pin 68, moving the overcenter linkage 65 upwardly.

Thus, when a succession of articles is released by removal of the obstruction to movement, pressure roller mechanisms are successively brought into engagement with the belt B so that successive portions of the live roller conveyor are energized. In this fashion, the entire load is not placed on the belt B at one time. It should be understood that the first pressure roller frame on the conveyor would be locked and released by a mechanism controlled automatically or manually.

I claim:
1. A conveyor comprising
a frame,
a plurality of conveyor rollers extending transversely and rotatably mounted in the frame,
a belt driven beneath the conveyor rollers,
and a plurality of pressure roller sections positioned at longitudinally spaced points beneath said belt for urging the belt into engagement with the conveyor rollers to drive the conveyor rollers and, in turn, articles in succession along said conveyor rollers,
means for mounting each said section for movement toward and away from the belt to move the belt into and out of driving engagement with the conveyor rollers,
a pair of trigger rollers individual to each said pressure roller section positioned in series with the conveyor rollers and adapted to be contacted by the belt,
means for mounting said trigger rollers with a conveyor roller between said pair of trigger rollers and for movement rearwardly by tracking along the underside of an article due to engagement of a trigger roller with the belt when an article is interrupted over the trigger roller in its movement on the conveyor,
and means responsive to the movement of the trigger roller longitudinally of the conveyor when an article is interrupted in its movement over a trigger roller for moving the pressure roller section to move the belt out of driving engagement with the conveyor rollers.

2. A conveyor comprising
a frame,
a plurality of conveyor rollers extending transversely and rotatably mounted in the frame,
a belt driven beneath the conveyor rollers,
a plurality of pressure roller sections positioned at longitudinally spaced points beneath said belt for urging the belt into engagement with the conveyor rollers to drive the conveyor rollers and, in turn, articles in succession along said conveyor rollers,
means for mounting each said section for movement toward and away from the belt to move the belt into and out of driving engagement with the conveyor rollers,
a pair of trigger rollers individual to each said pressure roller section positioned in series with the conveyor rollers and adapted to be contacted by the belt,
means for mounting said trigger rollers with a conveyor roller between said pair of trigger rollers and for movement rearwardly by tracking along the underside of an article due to engagement of a trigger roller with the belt when an article is interrupted over the trigger roller in its movement on the conveyor,
a clutch adapted to engage and grip said belt,
means actuated by the movement of the trigger roller longitudinally of the conveyor for momentarily engaging said clutch with the belt,
and means operated by the clutch for moving the pressure roller section away from the belt.

3. In a conveyor comprising a conveyor frame on which are mounted a plurality of conveyor rollers extending transversely and rotatably mounted in the frame, a belt driven beneath the rollers,
the improvement comprising a pressure roller section adapted to be positioned beneath said belt for urging the belt into engagement with the conveyor rollers to drive the conveyor rollers and thereby articles in succession along said conveyor rollers,
said section comprising a pressure roller frame,
means for mounting said pressure roller frame for movement upwardly and downwardly toward and away from the underside of the belt,
a plurality of longitudinally spaced pressure rollers rotatably mounted in the pressure roller frame with their axes adapted to be parallel to the axes of the conveyor rollers so that the pressure rollers are movable upwardly and downwardly toward and away from the belt as the frame is moved upwardly and downwardly for holding and releasing the belt from driving engagement with the conveyor rollers,
a trigger member pivoted to said pressure roller frame,
a pair of trigger rollers adapted to be rotatably mounted in the conveyor frame with a conveyor roller interposed between said trigger rollers and with said trigger rollers movable longitudinally thereof in such a manner that the trigger rollers are movable rearwardly relative to the conveyor rollers and engage the trigger member when an article is interrupted in its movement on the conveyor over a trigger roller by tracking movement of the trigger roller along the underside of the article due to the engagement of the trigger roller with the belt, a clutch actuated by said rearward movement of the trigger member for engaging and gripping the belt momentarily, and means operated by said clutch for lowering the pressure roller frame.

4. A conveyor comprising a frame, a plurality of conveyor rollers extending transversely and rotatably mounted in the frame, a belt driven beneath the conveyor rollers, and a plurality of pressure roller sections positioned at longitudinally spaced points beneath said belt for urging the belt into engagement with the conveyor rollers to drive the conveyor rollers and, in turn, articles in succession along said conveyor rollers, means for mounting each said section for movement toward and away from the underside of the belt to move the belt into and out of driving engagement with the conveyor rollers, a pair of trigger rollers individual to each said pressure roller section positioned in series with the conveyor rollers and adapted to be contacted by the belt, means for mounting said trigger rollers with a conveyor roller between said pair of trigger rollers and for movement rearwardly by tracking along the underside of an article due to engagement of a trigger roller with the belt when an article is interrupted over the trigger roller in its movement on the conveyor, means responsive to the movement of a trigger roller longitudinally of the conveyor when an article is interrupted in its movement over a trigger roller for moving the pressure roller sections to move the belt out of driving engagement with the conveyor rollers, and means for locking each said pressure roller section to hold the belt out of driving engagement with the conveyor rollers, said last mentioned means being engaged by movement of a preceding roller section into driving engagement position to unlock the pressure roller section.

5. A conveyor comprising a frame, a plurality of conveyor rollers extending transversely and rotatably mounted in the frame, a belt driven beneath the conveyor rollers, a plurality of pressure roller sections positioned at longitudinally spaced points beneath said belt for urging the belt into engagement with the conveyor rollers to drive the conveyor rollers and, in turn, articles in succession along said conveyor rollers, means for mounting each said section for movement toward and away from the underside of the belt to move the belt into and out of driving engagement with the conveyor rollers, a pair of trigger rollers individual to each said pressure roller section positioned in series with the conveyor rollers and adapted to be contacted by the belt, means for mounting said trigger rollers with a conveyor roller between said pair of trigger rollers and for movement rearwardly by tracking along the underside of an article when an article is interrupted over the trigger roller in its movement on the conveyor, a clutch adapted to engage and grip said belt, means actuated by the movement of a trigger roller longitudinally of the conveyor for momentarily engaging said clutch with the belt, means operated by the clutch for moving the pressure roller section away from the belt, and means for locking said pressure roller section to hold the belt out of driving engagement with the conveyor rollers, said last mentioned means being engaged by movement of a preceding roller section into driving engagement position to unlock the pressure roller section.

6. In a conveyor comprising a conveyor frame on which are mounted a plurality of conveyor rollers extending transversely and rotatably mounted in the frame, a belt driven beneath the rollers, the improvement comprising a pressure roller section adapted to be positioned beneath said belt for urging the belt into engagement with the conveyor rollers to drive the conveyor rollers and thereby articles in succession along said conveyor rollers, said section comprising a pressure roller frame, means for mounting said pressure roller frame for movement upwardly and downwardly toward and away from the underside of the belt, a plurality of longitudinally spaced pressure rollers rotatably mounted in the pressure roller frame with their axes adapted to be parallel to the axes of the conveyor rollers so that the pressure rollers are movable upwardly and downwardly toward and away from the belt as the frame is moved upwardly and downwardly for holding and releasing the belt from driving engagement with the conveyor rollers, a trigger member pivoted to said pressure roller frame, a pair of trigger rollers adapted to be rotatably mounted in the conveyor frame with a conveyor roller interposed between said trigger rollers and with said trigger rollers movable longitudinally thereof in such a manner that the trigger rollers are movable rearwardly relative to the conveyor rollers and engage the trigger member when an article is interrupted in its movement on the conveyor over a trigger roller by tracking movement of the trigger roller along the underside of the article due to the engagement of the trigger roller with the belt, a clutch actuated by said rearward movement of the trigger member for engaging and gripping the conveyor rollers momentarily, means operated by said clutch for lowering the pressure roller frame, and means for locking said pressure roller frame to hold the belt out of driving engagement with the conveyor rollers, said last mentioned means being engaged by movement of a preceding roller frame into driving engagement position to unlock the pressure roller frame.

References Cited by the Examiner

UNITED STATES PATENTS 3,012,652   12/1961   Poel _____ 198—127

SAMUEL F. COLEMAN, *Primary Examiner.*

ERNEST A. FALLER, *Examiner.*

UNITED STATES PATENT OFFICE
CERTIFICATE OF CORRECTION

Patent No. 3,219,172                                        November 23, 1965

Homer S. Harrison

It is hereby certified that error appears in the above numbered patent requiring correction and that the said Letters Patent should read as corrected below.

Column 6, lines 52 and 53, for "conveyor rollers" read -- belt --.

Signed and sealed this 27th day of September 1966.

(SEAL)
Attest:

ERNEST W. SWIDER                                    EDWARD J. BRENNER
Attesting Officer                                        Commissioner of Patents